United States Patent [19]
Ablay

[11] Patent Number: 5,408,466
[45] Date of Patent: Apr. 18, 1995

[54] DUPLEX INTERCONNECT DISPATCH TRUNKED RADIO

[75] Inventor: Sewim F. Ablay, Hoffman Estates, Ill.

[73] Assignee: Motorola, Inc., Schaumburg, Ill.

[21] Appl. No.: 471,020

[22] Filed: Jan. 22, 1990

Related U.S. Application Data

[63] Continuation of Ser. No. 915,933, Oct. 6, 1986, abandoned, which is a continuation of Ser. No. 857,514, Apr. 22, 1986, abandoned, which is a continuation of Ser. No. 678,733, Dec. 6, 1984, abandoned.

[51] Int. Cl.⁶ .......................... H04B 7/00; H04Q 7/04
[52] U.S. Cl. .................................... 370/24; 370/95.1;
    370/110.1; 455/54.1; 379/63
[58] Field of Search ............... 370/110.1, 110.2, 110.3,
    370/24, 38, 95.1, 31, 26, 30.32; 455/79, 82,
    188.1, 266, 31, 33, 56, 54, 75; 379/56, 57, 58, 59,
    60, 63

[56] References Cited

U.S. PATENT DOCUMENTS

| | | | |
|---|---|---|---|
| 3,641,433 | 2/1972 | Mifflin et al. | 455/79 |
| 3,786,199 | 1/1974 | Rimbach, Jr. | 379/58 |
| 3,956,589 | 5/1976 | Weathers et al. | 370/31 |
| 3,970,801 | 7/1976 | Ross et al. | 379/63 |
| 4,079,188 | 3/1978 | Kinch, Jr. et al. | 370/31 |
| 4,238,850 | 12/1980 | Vance | 370/24 |
| 4,246,582 | 1/1981 | Kondo et al. | 455/79 |
| 4,288,868 | 9/1981 | Grotjohann et al. | 370/31 |
| 4,308,429 | 12/1981 | Kai et al. | 455/33 |
| 4,381,561 | 4/1983 | Treiber | 370/24 |
| 4,399,555 | 8/1983 | MacDonald et al. | 379/59 |
| 4,593,389 | 6/1986 | Wurzburg et al. | 370/110.1 |
| 4,612,415 | 9/1986 | Zdunek et al. | 455/56 |
| 4,635,285 | 1/1987 | Coombes | 455/33 |
| 4,672,601 | 6/1987 | Ablay | 320/31 |
| 4,712,229 | 12/1987 | Nakamura | 455/33 |

FOREIGN PATENT DOCUMENTS

| | | | |
|---|---|---|---|
| 0039143 | 3/1983 | Japan | 370/31 |
| 0075945 | 5/1983 | Japan | 370/31 |

OTHER PUBLICATIONS

Manual for Microprocessor Radio Telephone Interconnect System, pp. 13-15, date unknown, published by Instrument Assiociates, Inc. of Memphis, Tenn.

*Primary Examiner*—Douglas W. Olms
*Assistant Examiner*—Min Jung
*Attorney, Agent, or Firm*—Steven G. Parmelee; Susan L. Lukasik

[57] ABSTRACT

A subscriber unit for use with a duplex communication system is described. The present invention contemplates a duplex transceiver which incorporates data and voice handling capability. A microprocessor generates data and DTMF signaling as well as decoding received data. According to the principles of the present invention, an improved duplex capable subscriber unit is achieved by coupling a microprocessor to a duplex transceiver through switchable filters. The filters exhibit a relatively fast or slow time constant depending on the state of a filter control input. The microprocessor is then capable of operating the subscriber unit with optimum frequency response characteristics depending on whether voice or data is being received. In addition, a summing network coupled between the microprocessor and the transmit switchable filter cooperates with the switchable filter and allows the duplex subscriber unit of the present invention to generate DTMF signaling.

17 Claims, 14 Drawing Sheets

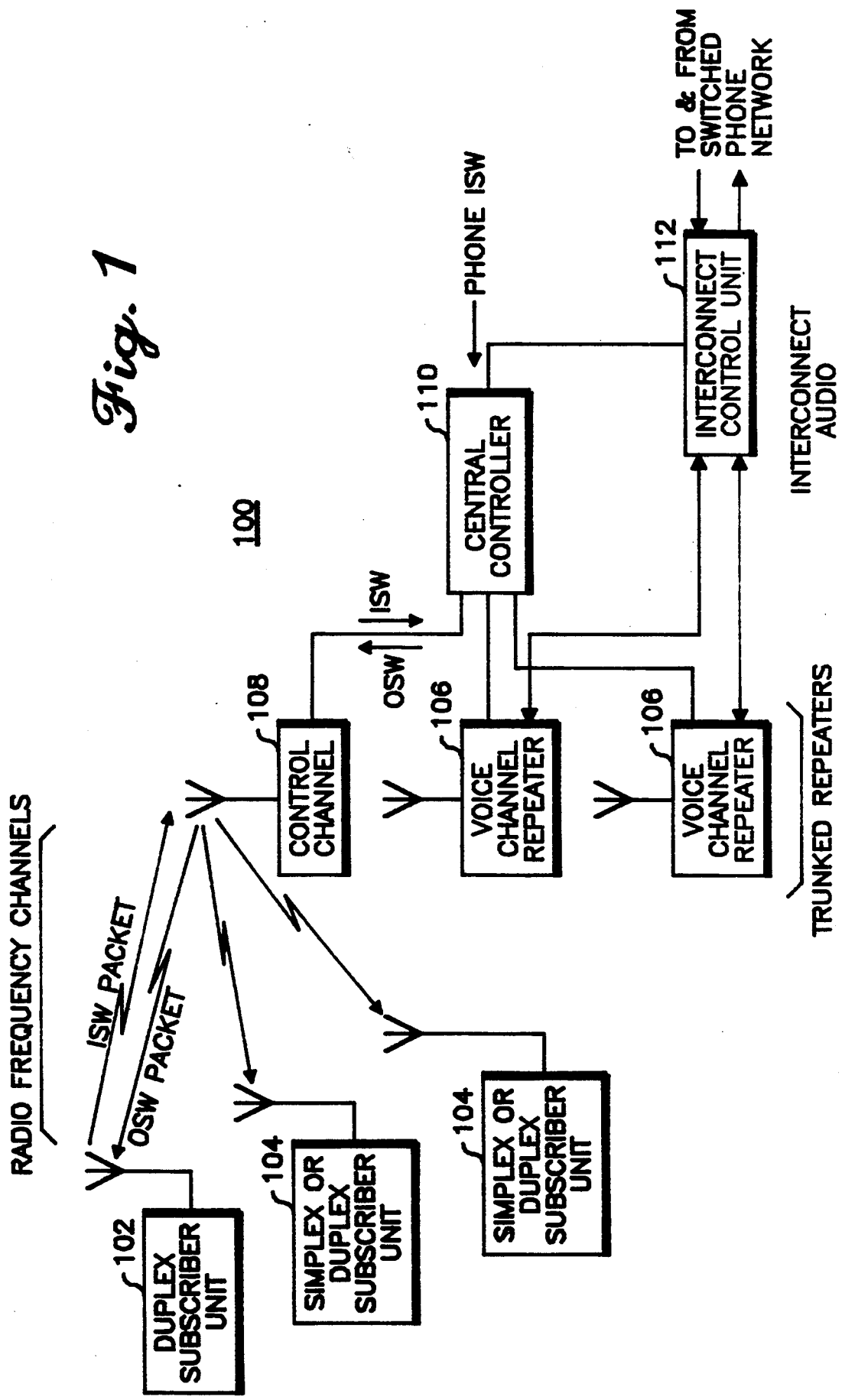

INBOUND SIGNALLING WORD

OUTBOUND SIGNALLING WORD

CONVENTIONAL DISPATCH TRUNKING (SIMPLEX)

SIMPLEX TELEPHONE INTERCONNECT

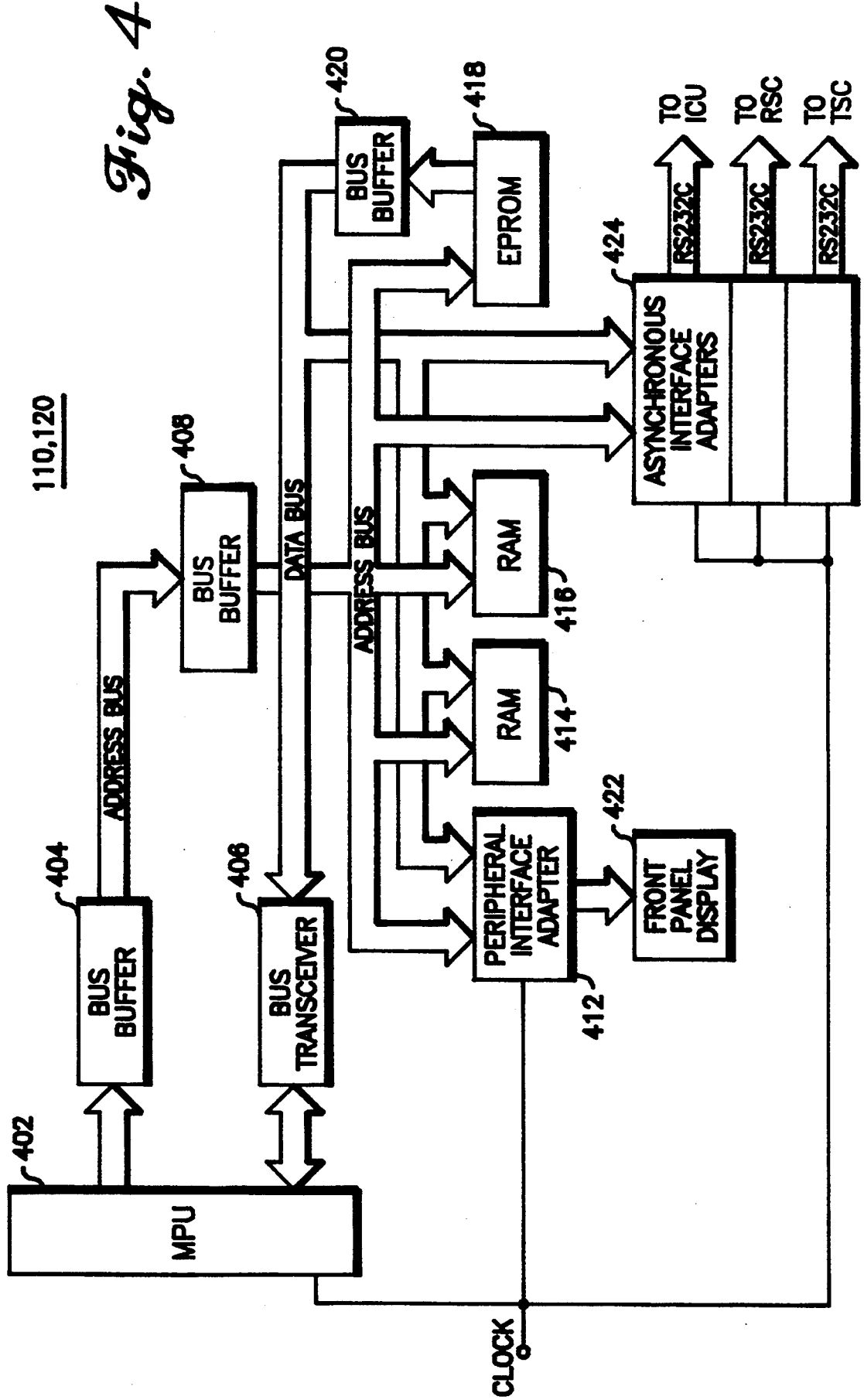

DUPLEX INTERCONNECT DISPATCH TRUNKED RADIO

This is a continuation of application Ser. No. 06/915,933, filed Oct. 6, 1986 and now abandoned which is a continuation of application Ser. No. 06/857,514, filed Apr. 22, 1986 and now abandoned, which is a continuation of application Ser. No. 06/678,733, filed Dec. 6, 1984, and now abandoned.

FIELD OF THE INVENTION

This invention relates generally to the field of trunked radio systems and specifically to a subscriber unit capable of providing simplex dispatch trunked system operation while also providing duplex telephone interconnect operation in one subscriber unit.

BACKGROUND OF THE INVENTION

Incorporating a telephone interconnect call mode of operation onto a trunked system has generally been constrained by the simplex (voice and data signaling) nature of trunked system subscriber units. Similarly, signaling and call processing by fixed-end control equipment is also simplex formatted. While the introduction of duplex voice/RF-capable subscriber units utilizing simplex data signaling with fixed-end control equipment improves the grade of uses interconnect service, their use restricts the amount of dynamic control and call status changes possible while processing a current, duplex voice-only call. Throughout the present specification, the term "simplex" is used in the same context as the term "2-way half-duplex" may be used, although the meaning is the same: capable of transmitting in either direction, but not in both directions simultaneously.

SUMMARY AND OBJECTS OF THE INVENTION

Briefly described the present invention contemplates a subscriber unit which provides duplex telephone interconnect service in a unit which is otherwise operational on conventional trunked radio systems. According to the principles of the present invention, an improved duplex capable subscriber unit is achieved by coupling a microprocessor to a duplex transceiver through switchable filters. The filters exhibit a relatively fast or slow time constant depending on the state of a filter control input. The microprocessor is then capable of operating the subscriber unit with optimum frequency response characteristics depending on whether voice or data is being received. In addition, a summing network coupled between the microprocessor and the transmit switchable filter allows the duplex subscriber unit of the present invention to generate DTMF signaling.

Accordingly, it is an object of the present invention to provide duplex telephone interconnect service, simplex telephone interconnect and conventional simplex trunked radio service in a subscriber unit.

It is another object of the present invention to provide a means of providing a subscriber unit which generates and decodes a plurality of signaling schemes.

It is still another object of the present invention to provide a subscriber unit for trunked radio system which is compatible with duplex telephone service.

It is another object of the present invention to provide a method and means of providing DTMF signaling over a simplex trunked radio channel.

BRIEF DESCRIPTION OF THE DRAWINGS

FIG. 1 is a block diagram of a trunked radio system which is interfaced to a conventional duplex telephone system.

FIG. 4 is a schematic and block diagram of the central control unit of FIG. 3.

DETAILED DESCRIPTION OF THE DRAWINGS

Figure 2A:
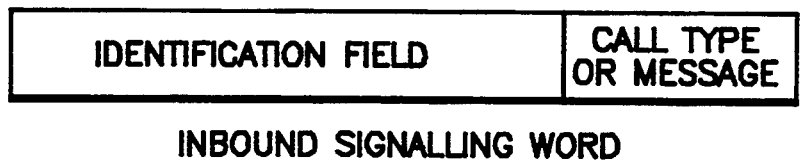
FIGS. 2a and 2b are timing diagrams showing the details of inbound and outbound signaling words used in accordance with the teachings of the trunked radio system of FIG. 1.

FIG. 1 is a block diagram of a trunked radio system which is coupled to a conventional telephone interconnect system. The trunked land mobile radio system 100 consists of subscriber units 102, 104, which may be either mobile or portable units, a plurality of trunked repeaters 106, and a trunked central controller 110. The trunked central controller 110 is also coupled to a control channel transceiver 108 which transmits and receives control information on a separate frequency. The trunked central controller 110 and trunked repeaters 106 are also connected to an interconnect control unit which controls the trunked repeaters and the public switched telephone network interface. The trunked radio system utilizes additional trunked repeaters as dictated by the number of channels operative on the trunked system. In the quiescent state, all subscriber units 102, 104 monitor the outbound frequency of the trunked repeater 108 which is designated as the control channel.

Figure 2B:
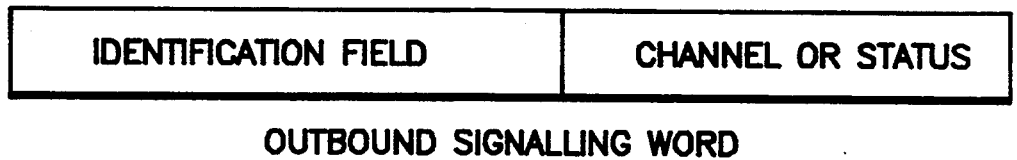
Figure 2C:
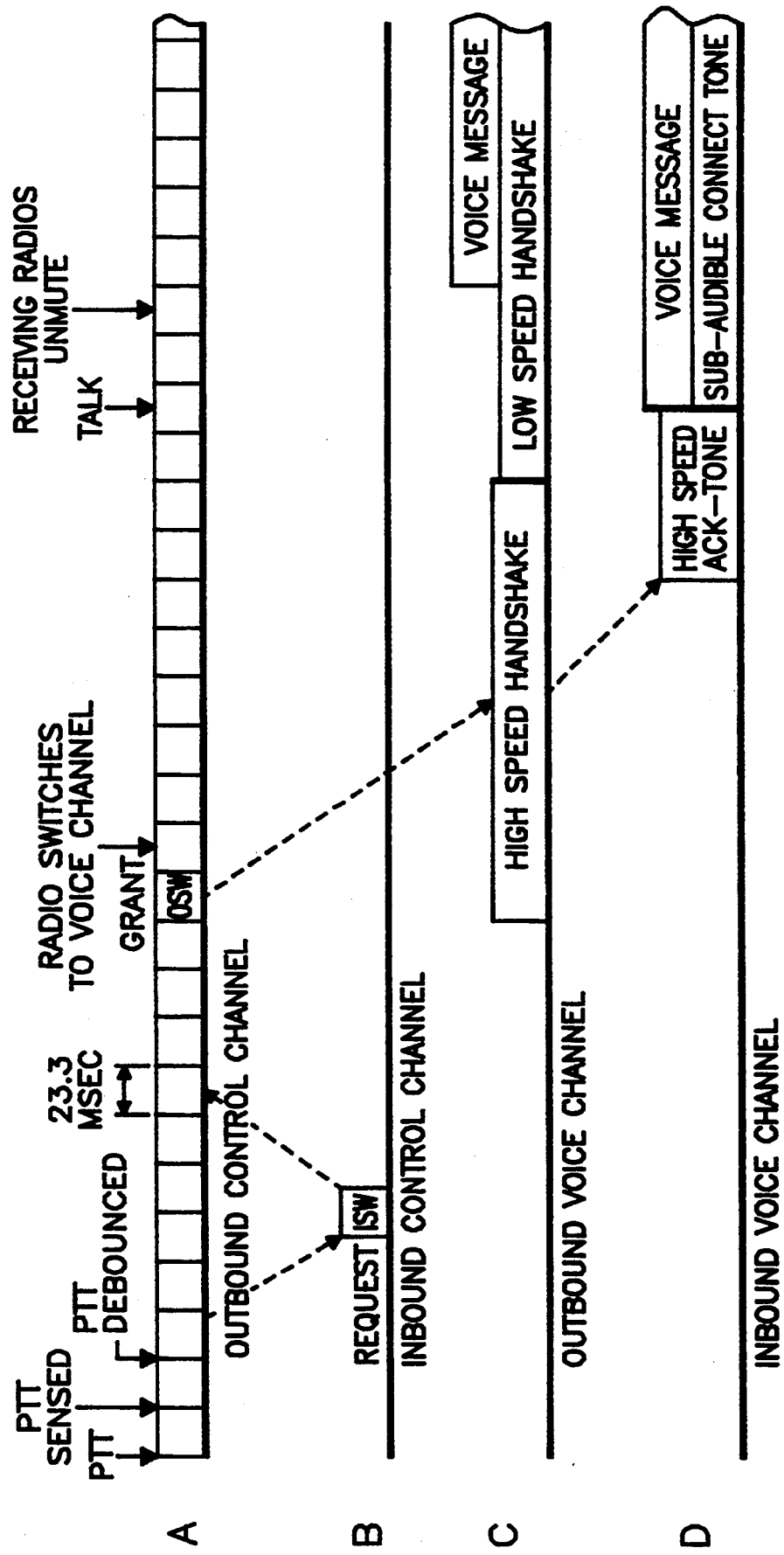
FIGS. 2c and 2d are timing diagrams showing the sequential signaling between a subscriber unit and the system central control unit which may be encountered in a typical simplex trunked radio system.
Figure 2D:
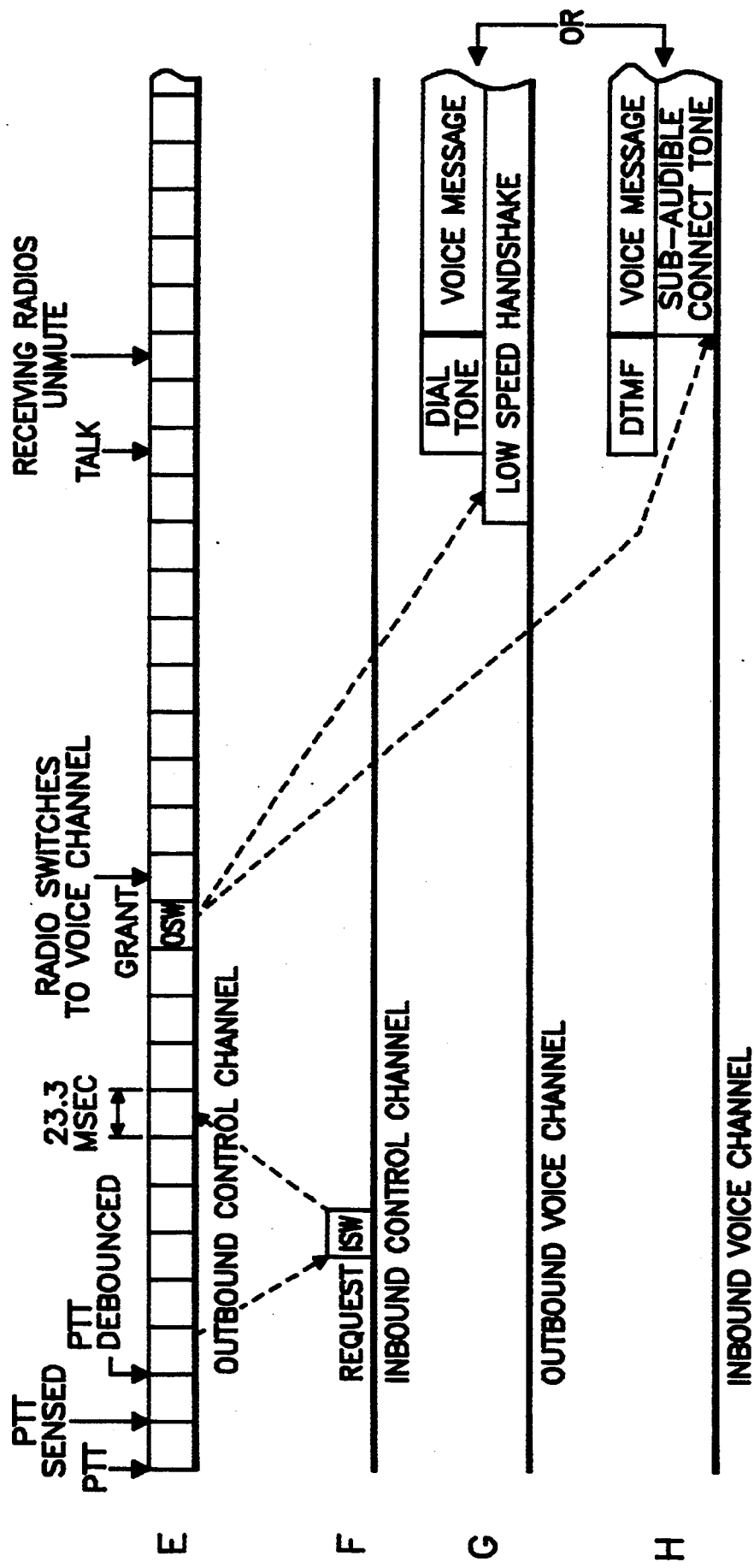

Referring now to FIG. 2c, to establish a "dispatch call" between a group of units operating on the trunked system, a subscriber unit 102 sends a data packet called an "Inbound Signaling Word" (ISW). The ISW is shown in FIG. 2a and it contains the requesting unit's unique ID code, consisting of a fleet ID, an individual ID, and a "subfleet" code indicating to which group of units it wants to talk. The ISW also contains a unique "call type" code which indicates that a dispatch call is the type of call desired. The request is forwarded to the central controller 110, which decodes the request, and transmits a data packet called an "Outbound Signaling Word" (OSW) to all subscriber units 102, 104 which are monitoring the outbound control channel. The OSW is a channel grant which contains the subfleet code, the requesting unit's ID code, and the voice channel number assigned for the conversation. The OSW causes the requesting unit to move to the voice channel and commence transmitting, and causes all mobiles with matching fleet and subfleet ID's to move to the voice channel as listening units. In this way, a group or "subfleet" call conversation is set up. If all the voice channels are in use, the central controller 110 sends the requesting subscriber unit 102 a "Busy OSW."

In the trunked radio system of the present invention, telephone interconnect calls may be established on the trunked radio system from either a mobile unit or a land based telephone interconnect caller. In the case of calls initiated from mobile units, an ISW request is sent as for the mobile to move to the voice channel while at the same time directing the interconnect control unit 112 to establish a connection from the corresponding repeater to the land based telephone line. A duplex unit receiving a channel grant also causes a duplex-capable controller to dynamically reconfigure its audio signal paths for duplex audio routing. In the preferred embodiment of the present invention, a subscriber unit 104 is also configurable to flow simplex interconnect telephone calls. If the central controller determines that an interconnect call should not be made, the central controller 110 sends the requesting unit 102 an "interconnect busy" OSW.

For calls initiated from the land line, the interconnect control unit 112 generates a request to the central controller 110 for a particular mobile to be assigned to an interconnected voice channel. The request takes the form of an ISW with the identification and call type information as described above. If a channel is available to be assigned, a "transmit OSW" is sent to the target mobile 102 or 104 in an effort to determine if it is actively turned on or operational. If it is, a "ring OSW" is sent via the outbound control channel to the target mobile 102. As in the case of the mobile to land call above, this central controller audio routing is adaptive to the type of target unit service requested. If the central controller 110 determines that an interconnect call should not be made at this time, a busy identification is returned to the land line caller. If the target mobile does not respond to the transpond OSW by issuing an "acknowledge ISW", the land-fine party is returned to a pre-determined signal indicating this and the central controller are terminating the call.

Figure 3A:
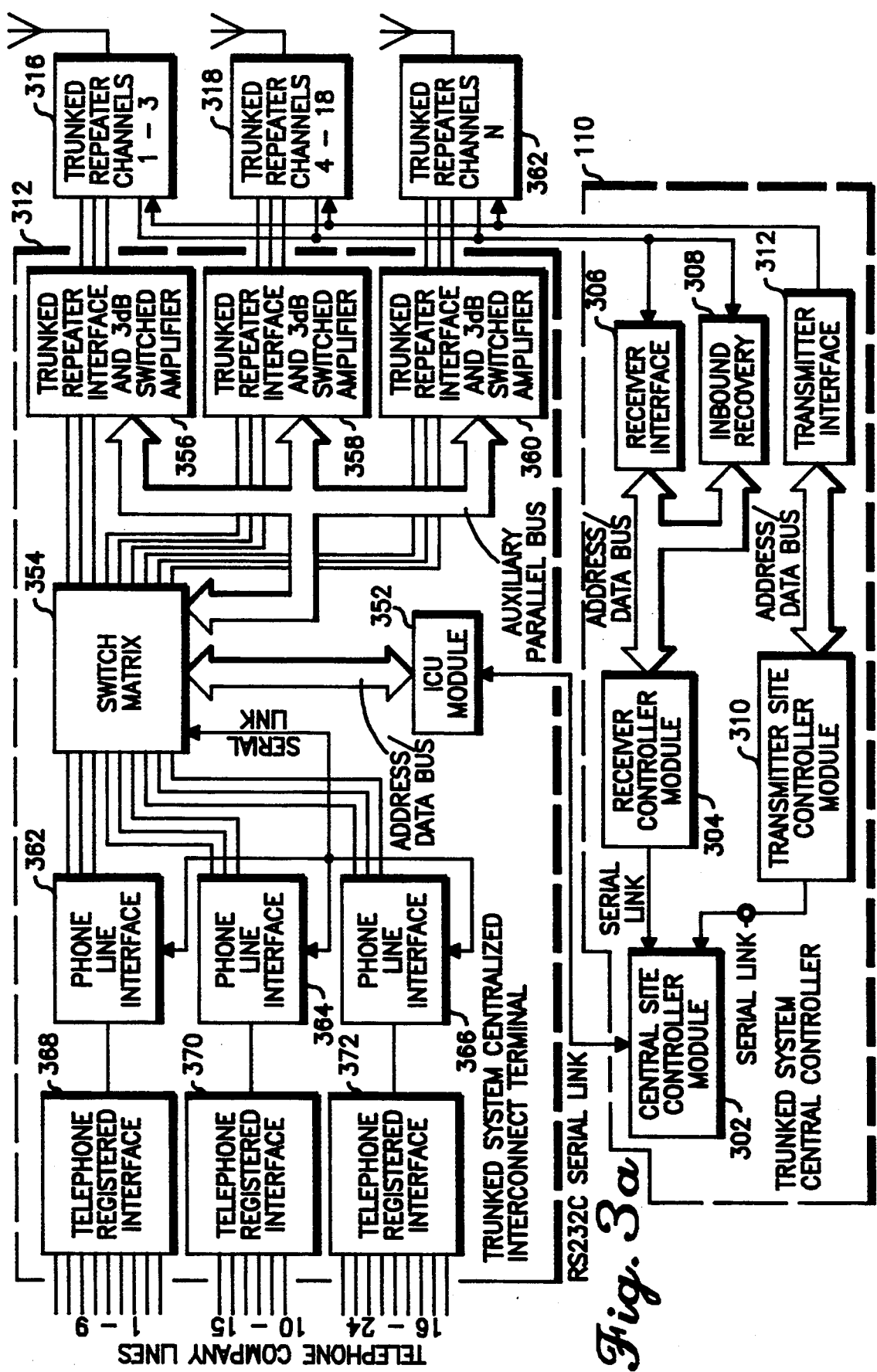
FIG. 3 is a more detailed block diagram detailing the construction of the fixed-site portion of the trunked radio system of FIGS. 1 and 2.

Referring now to FIG. 3a, there is shown a block diagram of a trunked radio system coupled to a telephone interconnect system which embodies the features of the present invention. The present invention operates with, but is not limited to, the trunked radio system of FIG. 1 with the addition of the telephone interconnect control unit 112. A mobile radio suitable for use as a subscriber unit 102, 104 in the trunked radio system of FIG. 1 is shown and described in detail in Motorola Instruction Manual 68P81064E20 entitled "Privacy Plus 1000 Radiotelephone." A repeater suitable for use in the trunking system of FIG. 1 is shown and described in Motorola Instruction Manual 68P81038E85 entitled "Micor Trunked Repeater." The above-mentioned manuals are incorporated herein by reference and may be obtained from the Service Publications Department of Motorola, Inc., 1301 East Algonquin Road, Schaumburg, Ill., or from Motorola C & E Parts, 1303 East Algonquin Road, Schaumburg, Ill.

Referring now to FIGS. 2a and 2b, there is shown a timing diagram detailing the configuration of the Inbound and Outbound Signaling Words described in FIG. 1. The Inbound Signaling Word comprises a 21 bit data packet which is sent from a requesting subscriber to the central controller when a channel assignment is required. The first sixteen bits correspond to an identification field, which identifies a particular unit's fleet, subfleet, and individual address assignments. The remaining five bits of the 21 bit packet identify the type of call or message to be communicated on the voice channel.

Referring now to FIG. 2b, the configuration of the Outbound Signaling word is shown in detail. The Outbound Signaling Word is used to communicate channel assignments from the central control unit to the requesting subscriber units. The Outbound Signaling Word comprises a 27 bit data packet wherein the first sixteen bits are used as a subscriber identification field. The remaining 11 bits communicate channel assignments or status information to the requesting mobile unit.

FIG. 3 is a more detailed block diagram of the trunked radio system of FIGS. 1 and 2. The trunked system central controller 110 of FIG. 1 consists of a central site controller module 302 which communicates with a receiver site controller module 304, a transmitter site control module 310, and the interconnect control module 352. Communication between these modules is via a conventional RS-232C serial interface. The central site controller 110 receives ISW's which are recovered from the receiver site controller module 304. The receiver site controller 304 is coupled to a plurality of receiver interface boards and an inbound recovery board 308 through an address data bus Which communicates the decoded repeater output from the inbound recovery board 308 or receiver interface board 306 to the receiver site controller 304.

After the ISW has been received, the central site controller module 302 responds to the requesting unit by generating an OSW containing channel assignment information. The OSW is communicated to the requesting unit via the serial data link coupled between the central site controller 302 and the transmitter site controller module 310. After the transmitter site interface board 312 receives the OSW from the central control module, it is placed on an address/data bus which is shared commonly with a plurality of transmitter interface boards which ultimately control the repeaters 316, 318, 320, etc. In response to an ISW, the central control unit 302 may additionally instruct the interconnect control unit 352 to interconnect a telephone line to a particular repeater. Communication between the central control module and the interconnect control module is via another RS-232C serial interface. The exact circuit configuration and detailed description of the operation of the central control unit 110 is described in conjunction with FIG. 5 and is further described in Motorola Instruction Manual entitled "Trunked System Central Controller," Numbers 68P81047E50 and 68P81066E60, available from the Service Publications Department of Motorola, Inc., 1301 East Algonquin Road, Schaumburg, Ill.

The interconnect control unit 112 of FIG. 1 consists of the interconnect control module 352 which controls the operation of the switch matrix boards 354, the interconnect line interface boards 362,364, 366, and the trunked repeater interface boards 356, 358, and 360. The interconnect control module 352 communicates with the switch matrix 354 via a parallel address/data bus. The interconnect control unit communicates with the interconnect line interface boards through the matrix 354 and a serial link which couples the phone line interface boards 362, 364, and 366 with the switch matrix 354. The interconnect control module communicates with the trunked repeater interface boards 356, 358, and 360 via the auxiliary parallel address/data bus coupled between the switch matrix 354 and the trunked repenter interface boards 356, 358, and 360. The phone line interface boards 362, 364, and 366 are additionally coupled to telephone registered interface boards 368, 370, and 372. The telephone line interface boards 362, 364, and 366 are used to generate and decode the various signaling tones which are required to control the operation of the telephone interconnect system. The registered interface boards are used for signal conditioning and level control before the telephone signal is applied to the switch matrix 354. The operation of the interconnect control unit 112 is described further in conjunction with FIG. 5. A detailed circuit diagram and operation of the interconnect control unit 112 is shown and described in Motorola Instruction Manual 68P81063E20 entitled "Trunked System Central Controller," available from the Service Publications Department of Motorola, Inc., 1301 East Algonquin Road, Schaumburg, Ill. This and the above-mentioned manuals are all incorporated herein by reference.

When a given telephone interconnect is requested from a subscriber unit, control module 302 instructs the interconnect control module 352 to obtain a telephone connection via the phone line interface board and couple the phone line to a specific repeater. The phone line interface board output 362, 364, or 366 and the trunked repeater interface boards 356, 358, or 360 are then coupled via the switch matrix 354. The output of the particular trunked repeater interface board is then coupled to a particular trunked repeater as instructed by the interconnect control unit. Telephone interconnect calls either requested or targeted for a duplex subscriber unit also cause received audio from same to be mixed with landline audio via the trunked repeater interface boards 456, 458 Or 460 instead of being directly transmitted via repeaters 316, 318, or 360. Audio control circuitry located on interface boards 356, 358 or 360 establishes this audio gating via trunked repeaters audio line drive circuitry, based upon commands from the interconnect control module 352.

If an interconnect is required from land line to a mobile unit, the telephone interface boards 362, 364, or 366 detect the phone signaling on the land line and then notify the interconnect control unit that a call is waiting on line "N." This message is communicated via a serial link. The interconnect control then requests a repeater channel by placing an ISW on the serial link coupled between the interconnect control unit and the system central controller. The system then assigns a repeater and instructs the interconnect control module 352 to couple telco line "N" to a specific repeater via the switch matrix 354 and the trunked repeater interfaces 356, 358, and 360.

Telephone interconnect calls for both mobile-initiated and land line initiated calls are terminated by the central controller 110 according to the same method wherein the central control unit 110 signals the mobile unit and the land line interconnect that the call is about to be terminated by sending commands which instruct the interconnect control unit to terminate the interconnect and instruct the mobile unit to return to monitoring the control channel. The mobile unit may terminate an interconnect call by sending an end of call signal, in the form of an ISW, to the central controller 110. In a similar fashion, if the telephone interconnect caller terminates the call, the interconnect control unit 112 signals the end of the interconnect by sending an end of call ISW to the central control unit 110.

Figure 3B:
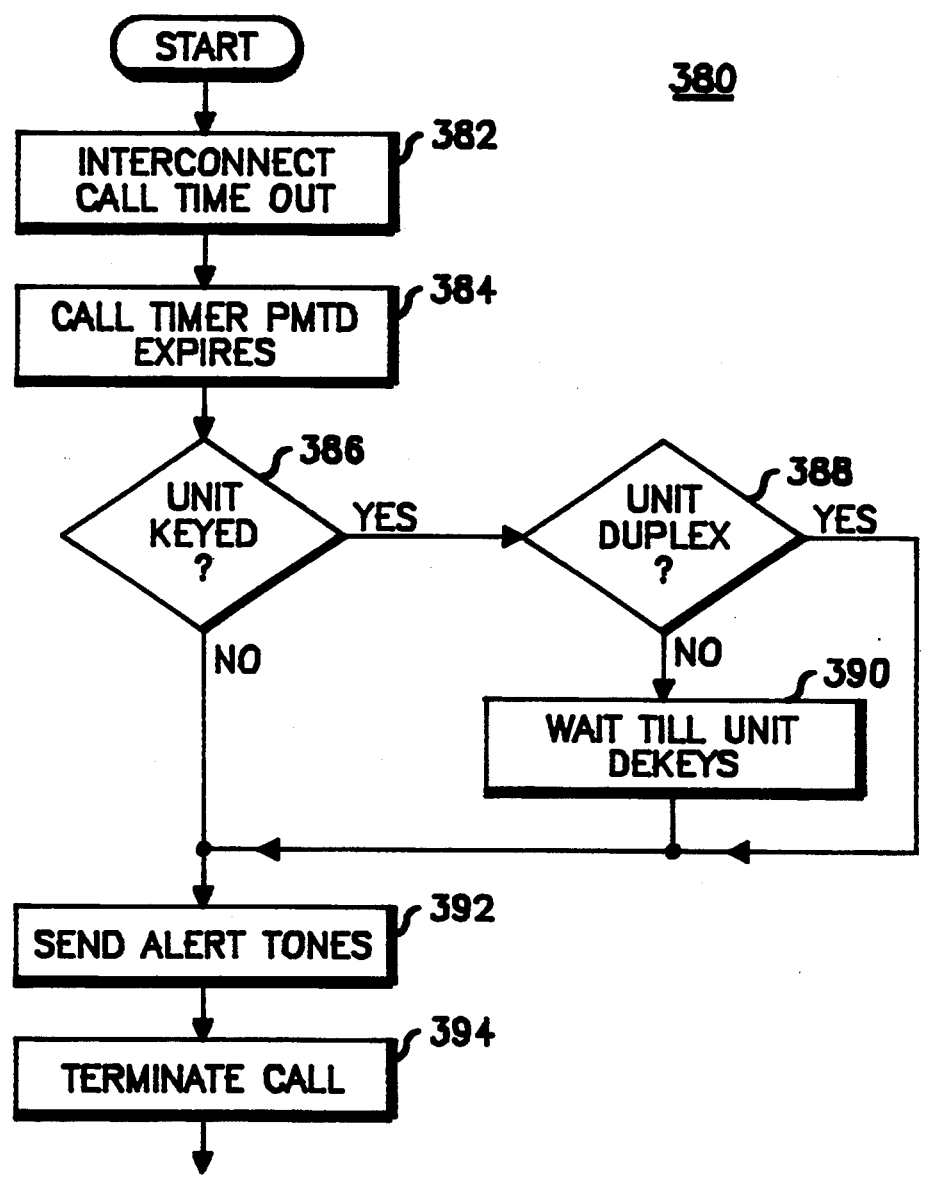

Referring now to FIG. 3b, there is shown the interconnect call time-out routine. Whenever an interconnect call is assigned, a timer the length of the interconnect call limit is started. According to FIG. 3b, Item 384 is selected whenever the timer expires. When the timer expires, the call is terminated after warning tones are sounded to the mobile and land line callers. Item 384 selects decision 386 which examines the repeater output 106 receiver to determine whether the particular subscriber unit is currently "keyed" or transmitting. If the mobile is still keyed, decision 386 selects decision 388. If the unit is duplex, alert tones are sent to the subscriber via item 392 and the call is terminated via item 394. Else decision 388 waits for a subscriber to dekey before starting the call termination sequence.

Referring now to FIG. 4, there is shown an electrical schematic and block diagram of the central controller 110, and the telephone interconnect control unit 120 of FIG. 2. As mentioned earlier, the central controller and telephone interconnect controller 120 utilize the same processing unit. The control unit comprises a general purpose microprocessor 402 which interfaces with a bus buffer 404 and a bus transceiver 406. The microprocessor supports the basic operation of the central control unit, as well as the operation of the telephone interconnect control unit. Microprocessor 402 may be any general purpose microprocessor such as a Motorola MC6809 available from Motorola Semiconductor, Inc., 3501 Ed Bluestein Boulevard, Austin, Tex. The bus buffer 404 is additionally coupled to bus buffer 408 which provides address information to the peripheral interface adapter (PIA) 412, the random access memories (RAM) 414, and 416, the read-only memory (ROM) 418 and the asynchronous interface adapter (ACIA) 424. Bus transceiver 406 communicates data between the microcomputer 402 and the peripheral interface adapter 412, the RAM memories 414, 416, the ROM 418 and the asynchronous interface adapter 424. The PIA 412 is additionally coupled to a front panel display which serves as a system indicator. The asynchronous interface adapter converts the data present on the data bus to the serial signals communicated between the central control module and the receiver site controller, the transmitter site controller and the interconnect control unit 112 of FIG. 4. The peripheral interface adapter 412, the RAM memories 414, 416, the ROM 418, and the asynchronous interface adapter 424 may be any of several off-the-shelf components which are designed to interface with the microcomputer described above.

Figure 5:
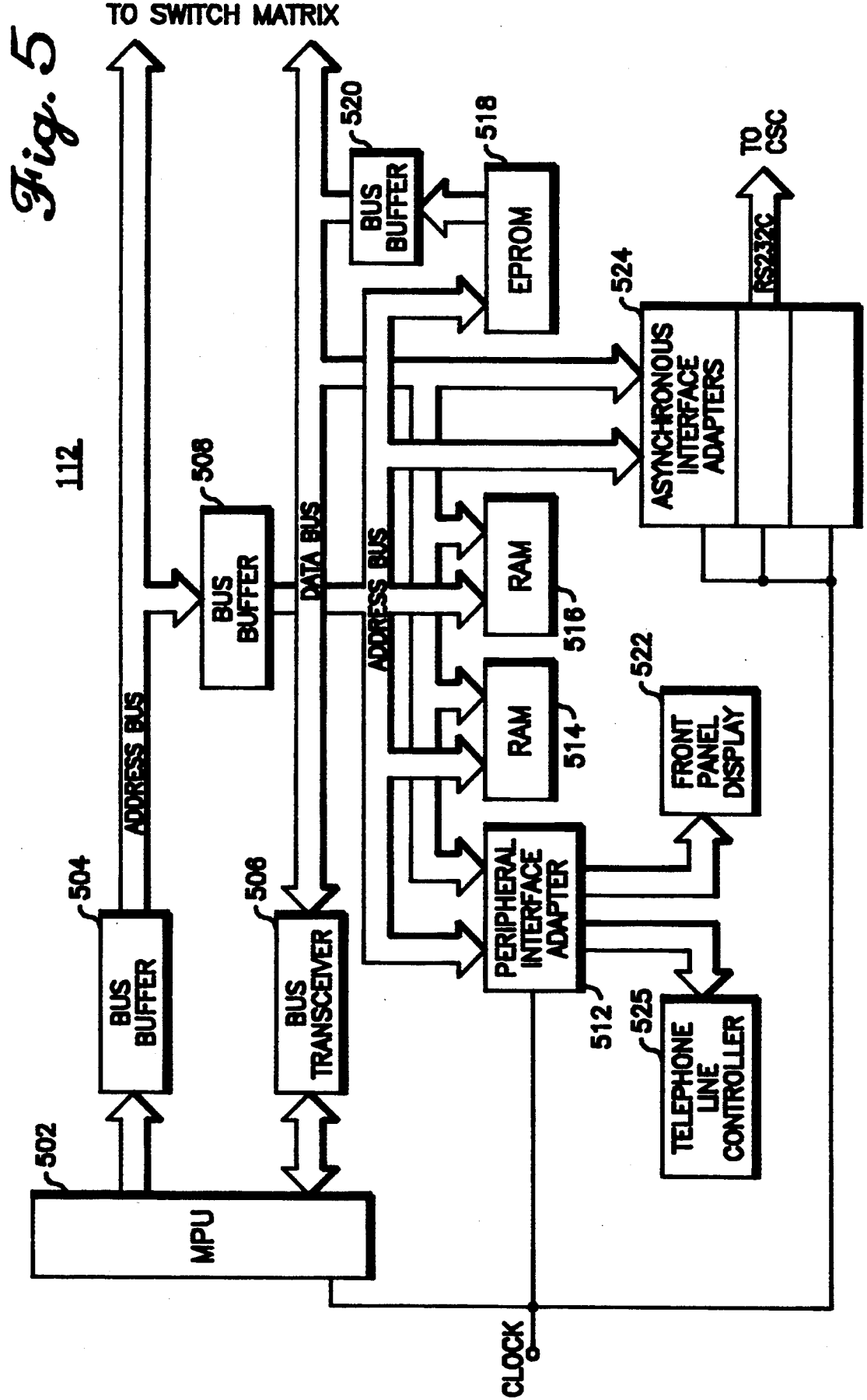
FIG. 5 is a schematic diagram of the interconnect control unit of FIG. 3.

Referring now to FIG. 5, there is shown an electrical schematic and block diagram of the interconnect control unit 112 of FIG. 2. The interconnect control unit comprises a general purpose microprocessor 502 which interfaces with a bus buffer 504 and a bus transceiver 506. Microprocessor 502 may be any general purpose microprocessor such as a Motorola MC6809 available from Motorola Semiconductor, Inc., 3501 Ed Bluestein Boulevard, Austin, Tex. The bus buffer 504 is additionally coupled to bus buffer 508 which provides address information to the peripheral interface adapter 512, the random access memories 514, and 516, the read-only memory 518 and the asynchronous interface adapter 524. Bus transceiver 506 communicates data between the microcomputer 502 and the peripheral interface adapter 512, the RAM memories 514, 516, the ROM 518 and the asynchronous interface adapter 524. The PIA 512 is additionally coupled to a front panel display 522 which serves as a system indicator, and a parallel data bus which couples the phone line interface circuits 462, 464, and 466 of FIG. 4. The interconnect control module is also coupled to the switch matrix 454 and trunked repeater interface boards 456, 458, and 460 of FIG. 4 via the data and address bus outputs of bus buffer 504 and bus transceiver 506. The asynchronous interface adapter converts the data present on the data bus to the serial signals communicated between the central control module and the interconnect control unit 112 of FIG. 4. The peripheral interface adapter, the RAM memories, the ROM, and the asynchronous interface adapter may be any of several readily available components which are designed to interface with the microcomputer described above.

The operation of the present invention will be discussed in full detail below. Briefly, however, the operation of the present invention may be summarized as follows.

All activated trunked subscriber units which are not currently processing a call are directed by an internal radio control process to continuously receive a binary-encoded data stream from the Central Site Controller (CSC). This sequence is shown in lines A, E, and I of FIGS. 2c, 2d, and 2e respectively. This data stream consists of a sequence of data packets transmitted over a single RF channel. The data may contain specific information to be used by one or more subscribers in originating a request for, or commencing an actual call on a dedicated voice RF repeater channel. In the absence of any user-specific call grant information, the data stream is used by a radio for the purpose of bit-syncing its internal data recovery circuitry.

For calls initiated from subscriber units, an ISW request is sent from the unit to the central controller 110 as line dispatch calls above, except that the "call type" code is that for an interconnect call. The central controller sends an OSW "channel grant" to the requesting subscriber, causing it to move to the voice channel, while at the same time directing the interconnect control unit to establish a connection from the corresponding repeater to the land based telephone line.

For calls initiated from the land line, the interconnect control unit generates a request to the central controller for a particular subscriber to be assigned to an interconnected voice channel. The request takes the form of an ISW with the identification and call type information as described above. If a channel is available to be assigned to the interconnect call, a "ring OSW" is sent via the outbound control channel to the target subscriber.

Once transferred to a voice channel, the present invention causes the target subscriber to begin a unique duplex data signaling protocol concurrent to the RF duplex operation just begun, when a duplex telephone interconnect call is being processed.

The operation of the present invention is best described in two parts. The first portion below involves an operational overview of the subscriber units, including a functional description of circuit elements and related control functions. The second portion of the description relates to the key control algorithms which operate in accordance with the teachings of the present invention.

Figure 6:
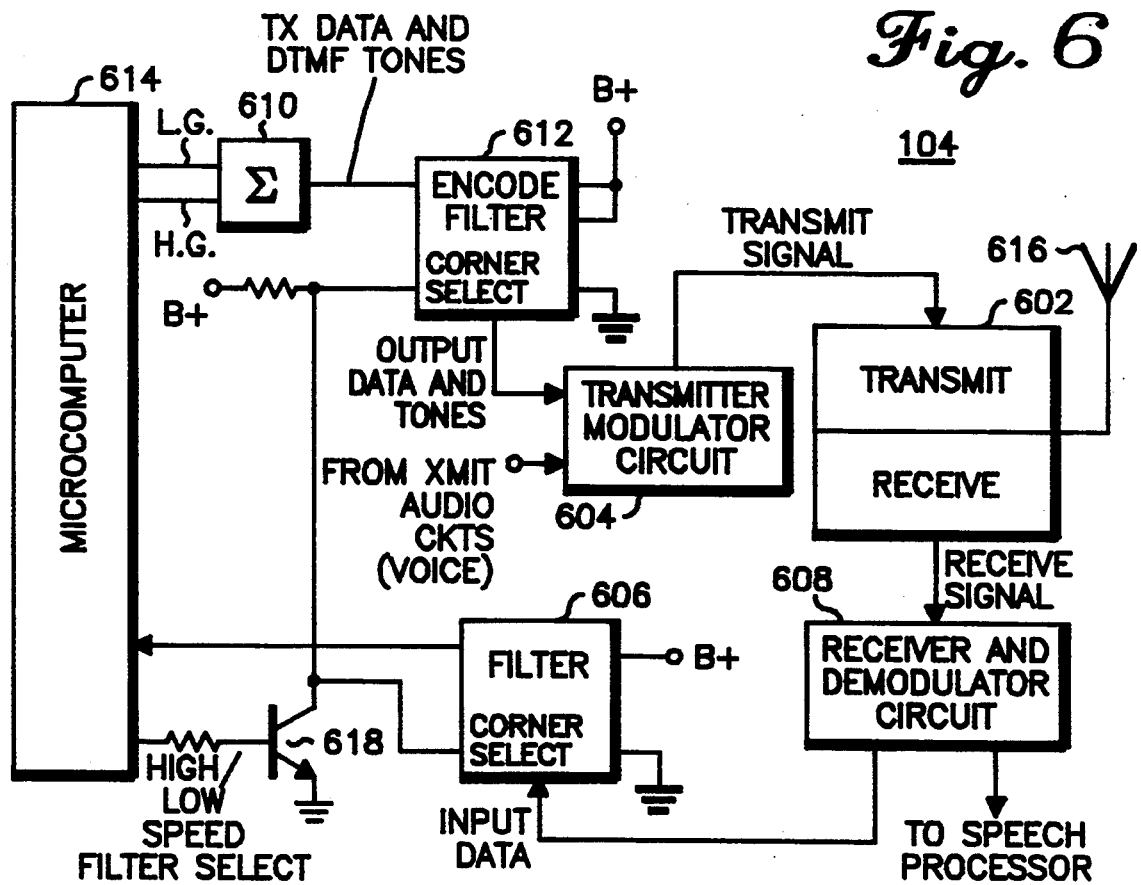
FIG. 6 is a schematic and block diagram of the preferred embodiment of the subscriber unit configuration which may be used in accordance with the teachings of the present invention.

Referring now to FIG. 6, there is shown an electrical schematic and block diagram of the preferred embodiment of a subscriber unit 104. In the operation of the subscriber unit, an RF signal is either received or transmitted through the duplex filter element 602. The duplexer filter element 602 is comprised of two subsections, which provide overload protection to receiver circuit 608 while concurrently routing amplified transmitter energy via circuitry 604, 602, and to antenna 616, thus providing RF duplex operation.

In the case of a mobile-to-land call, once the subscriber unit 104 is transferred to the "granted" voice channel for a duplex interconnect call, the present invention causes the requesting subscriber unit to execute a duplex data protocol in cooperation with the central controller 110 of FIG. 1 for the duration of the RF duplex operation. The subscriber unit 104 concurrently decodes and processes received data that has been demodulated via receive circuitry 608, filtered via receive filter 606, and processed via host processor 614. This process is shown in lines K and L of FIG. 2e. Microcomputer 614 may be any general purpose microcomputer such as a Motorola MC6803 available from Motorola Semiconductor, Inc., 3501 Ed Bluestein Boulevard, Austin, Tex. Microcomputer 614 is also the source of a data or tone transmitted signal that is monitored by the central controller 110, for purposes of establishing and monitoring the presence of subscriber activity on the grant voice channel. This signal is coupled to a summing circuit 610, that is also used as a common node for other signal outputs from processor 614. The signal is then filtered via encode filter 612. This filter, along with input filter 606, is capable of operating with one of two selectable frequency characteristics via switch 618 controlled by processor 614. For the present discussion involving a duplex interconnect call type, filters 606, 612 are configured to pass signals having low or subaudible spectral components. The filtered transmit tone signal is passed to transmit circuitry 604 for modulating an RF carrier, which is amplified and coupled to an input port of duplex filter 602, which is in turn coupled to antenna 616.

A dial-tone is supplied to the radio subscriber user once the audio is unmuted. In response to this, the user may either enter telephone number digits via an external [a] DTMF encoder input (as depicted in phantom lines by the numeral 611) or as in the preferred embodiment of the invention in FIG. 6. The circuitry in FIG. 6 is capable of outputting low or high speed or frequency tones for transmission, tones, whose two frequency components are summed via summer 610, to become DTMF-formatted as well as high-speed data and tones. Summer 610 then operates as a stage which provides gain.

This signaling continues for the user-active (voice) portion of the telephone interconnect call. By allowing reception and decoding of inbound data, the present invention allows the subscriber unit 102, 104 to be dynamically controlled via the central controller during a call. This capability improves call handling in several ways. The subscriber units call status, which is stored and internally updated, can be changed by a data word change (OSW) received and decoded via processor 614. For example, an emergency status situation could override the priority of a phone call type and alert the operator. Further, the subscriber unit could detect a marginal RF signal environment by loss of decoded inbound data; the receiver audio from circuit 608 could be muted. The present invention also permits the subscriber unit to automatically terminate the call if a long-term data loss is detected. In addition, the central controller may terminate the interconnect call without waiting for a (simplex data-equipped) subscriber unit 104 to stop transmitting, since it is aware that the requesting subscriber is duplex-capable, as was described above in conjunction with the description of FIG. 3b. This duplex data handling capability may improve system access delays for interconnect call requests, since a voice channel could subsequently be reassigned with little further delay. Finally, the duplex data signaling of the present invention allows for a smooth control channel data handoff and/or interconnect call continuation (if in progress) if the subscriber unit 104 is operating in an area having a plurality of active trunked systems as shown in FIG. 1. If the subscriber radio 104 physically leaves the primary coverage area of one system and enters another system capable of supporting this form of extended coverage, the current interconnect call can continue with minimum handoff delay in data and voice signaling.

Figure 7:
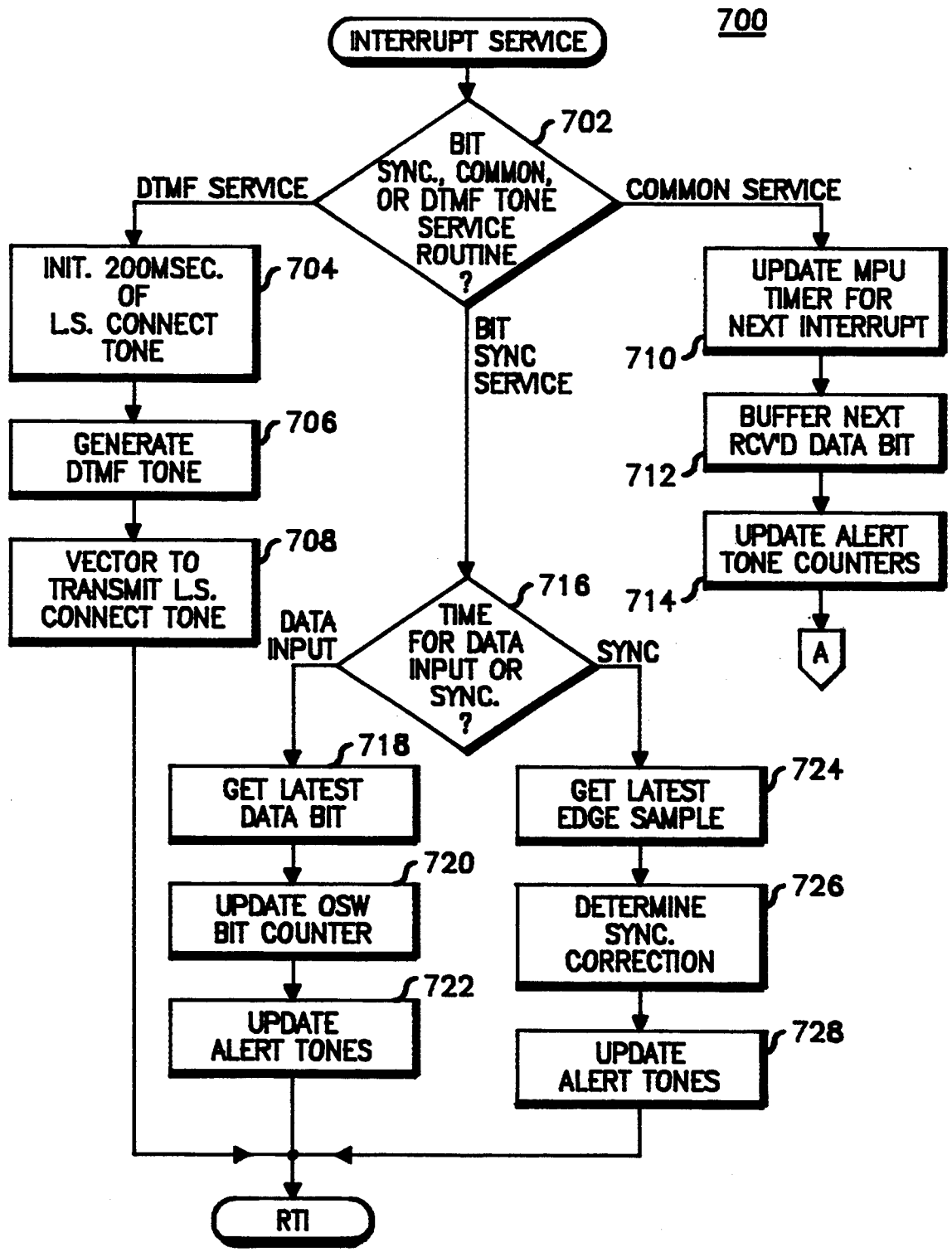
FIGS. 7 through 12 are flow diagrams detailing the operation of the subscriber unit microprocessor of FIG. 6.
Figure 8:
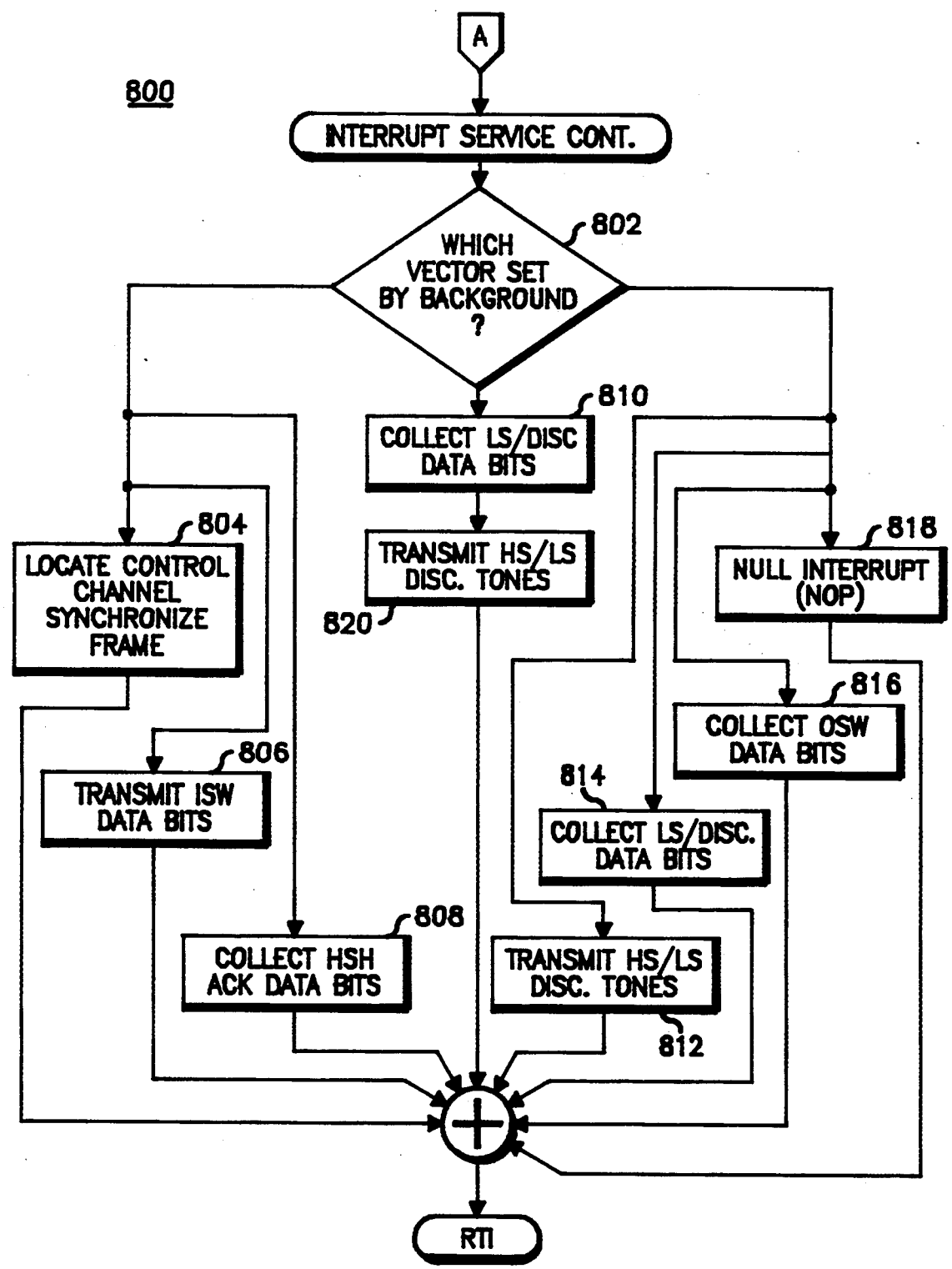

Referring now to FIGS. 7 and 8, there are shown flow diagrams which describe a portion of the control operation of the host processor 614 of FIG. 6 as it relates to the present invention. Processor 614 is controlled by a real-time, interrupt-driven program comprised of an interrupt service routine and a number of related background routines (not shown) that control the primary function being performed at any one time. These background routines are relatively simple in nature and are used to activate the method of the present invention as well as control the overall operation of the radio. The structure of these backgrounds would be obvious to one of ordinary skill in the art and many alternative routines would function satisfactorily in accordance with the teachings of the present invention. Periodic timer interrupts are controlled by a internal programmable timer resident in microcomputer 614.

Figure 2E:
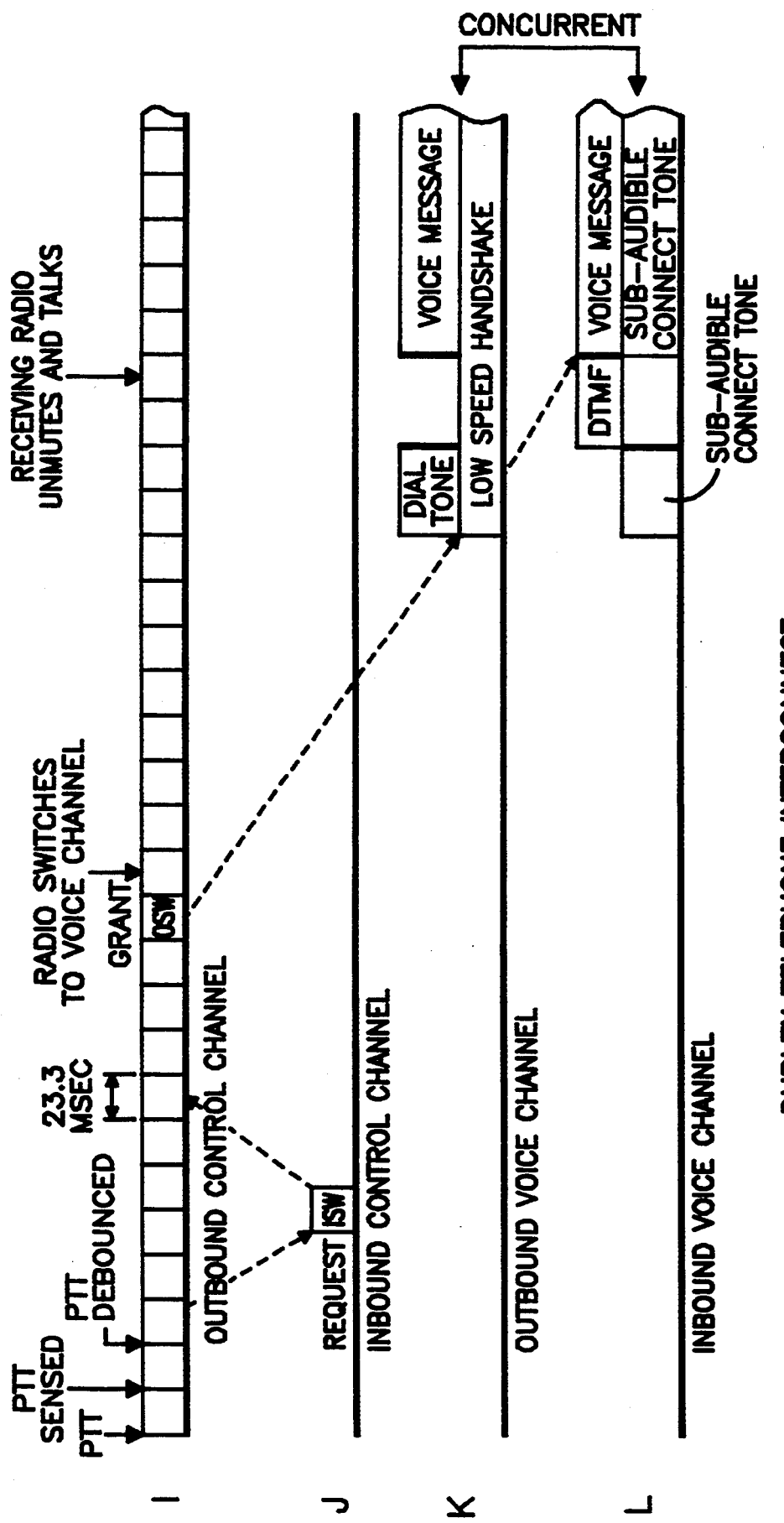
FIG. 2e is a timing diagram showing the sequential signaling between a subscriber unit and the system central control unit which would be encountered in the duplex interconnect/dispatch trunked radio system of the present invention.

According to FIG. 7, routine 700 begins execution when the microcomputer 614 internal timer interval is reached. Decision 702 examines a stored vector which is stored by one of several currently executed background routines and is caused to be set by the radio operator requesting DTMF service or by current data decoding or bit synch status. Decision 702 determines whether item 704, 710, or decision 716 is to be executed next. If transmission of a DTMF tone was requested after receiving an interconnect voice channel grant, initialization for 200 msec. of low speed connect tone transmission is provided by item 704. DTMF tone transmission parameters are set up by item 706, and item 708 resumes subsequent connect tone transmission, as is shown in FIGS. 2e, line 1. Connect tone is both prefixed and suffixed by DTMF tones to ensure that the central controller does not falsely decode a loss of voice channel activity and erroneously terminate a call.

Decision 716 is selected periodically to maintain bit synchronization via a software phase-locked loop or to buffer the latest data bit and record its passing. Bit synch via items 724, 726 and 728 to the control channel data is accomplished by interrupting the processor 614 at twice the data rate. This is equivalent to taking two samples per bit. The phase-locking (clock phase) process attempts to sample the bit in the bit time center as well as the edge times. Briefly, the phase-lock correction (not shown) operates as follows: If the two most recent edge samples are compared, and if found to be different, a data edge exists between them. In this case, the state of the center sample determines whether the clock phase is advanced or retarded.

If adjacent samples agree, no incremental clock phase correction is done and it either buffers the latest data via 718 or samples the received data to test for a bit boundary via item 724. After item 718, item 720 updates an internal OSW bit counter whenever a bit boundary has passed. This is used for subscriber unit 104 synchronization relative to the central controllers 1100 outbound OSW data word boundaries. Item 722 updates the status of any user alert tones that may be currently being generated by processor 614 and routed to a user loudspeaker, then control returns to the previously-interrupted background routine. Decision 702 selects item 710, if neither bit sync nor DTMF tone service is required. Item 710 updates the processor time interval for the next interrupt, and item 712 causes sampling of the next received data bit via data filter 606 output. Item 714 then updates the status of any active user alert tones by either toggling or maintaining the current state of the processor 614 output port.

Routine 800 of FIG. 8 is the continuation of execution given decision 702 selected item 710. Decision 802 selects either item 804, 806,808, 810, 812, 814, 816, or 818 as set by the corresponding background routine to accomplish a specific periodic task. Control may be passed to item 804 which tests the currently-buffered receive data bits to determine if the control channel synchronization frame was received. The background vector was previously set here if the radio is in the quiescent state on the control data channel attempting to remain in bit and OSW word synchronization. Alternatively, control is passed to item 806 when there is a need to transmit an ISW. Control is subsequently returned here each interrupt period until the entire ISW is transmitted. Item 808 is executed to detect whether high speed hand shake data was detected in response to a central controller channel grant for a dispatch call. If detected, an acknowledgement (ACK) is transmitted when the currently-executed background routine sets the interrupt vector to point to item 812, which would be selected by decision 802. Processor 614 then samples each of the central-controller generated bits transmitted via repeater 106. If not detected, the radio returns to the control channel and attempts resynchronization.

Item 810 is executed for the present invention when a duplex interconnect call grant directs the subscriber unit to a voice channel. It majority votes these data samples, storing the voted result each bit time in a temporary register. Executed during the same interrupt service routine interval is item 820 which manages the generation of low speed connect tone which is required by the central controller 110 for the present invention, to maintain an assignment to the current voice channel. Items 810 and 820 are executed for the duration of the user-active voice portion of a duplex interconnect call as discussed above in conjunction with FIG. 2e.

Either item 812 or 814 is executed during either simplex interconnect or dispatch call types, depending upon the units receive or transmit state. Item 812 generates either high speed, low speed, or disconnect tones for transmission depending upon call status as described above for item 820. A disconnect tone is formatted and transmitted upon de-keying the user transmit switch. Item 814 is similar to item 820.

Item 816 formats and stores buffered OSW data bits for further decoding by a background software routine. Item 818 alternatively is executed when no tasks other than common service in FIG. 7 are required during the current interrupt period. Interrupt service execution terminates at this point for all control flow paths discussed above.

FIGS. 9, 10, 11, and 12 relate to the control flow executed when either a dispatch (simplex) or interconnect (simplex or duplex) call type request has been processed and voice-channel operation is ready to commence within the subscriber unit. Control is transferred to routine 900 from a call-type executive routine (not shown) that initializes parameters tested below.

Briefly, this high level routine is responsible for directing control once the outbound signaling word data in FIG. 2b has been decoded. If a subscriber unit I.D. match is found, routines 900, 1000, 1100, and 1200 are executed based upon data derived from the outbound signaling word, such as the unit's I.D., the type of call, etc., and subscriber unit hardware and option information stored in long term memory (i.e. a EEPROM). RAM variables derived from this data are used to alter the control flow of these routines, as will be described below.

Figure 9:
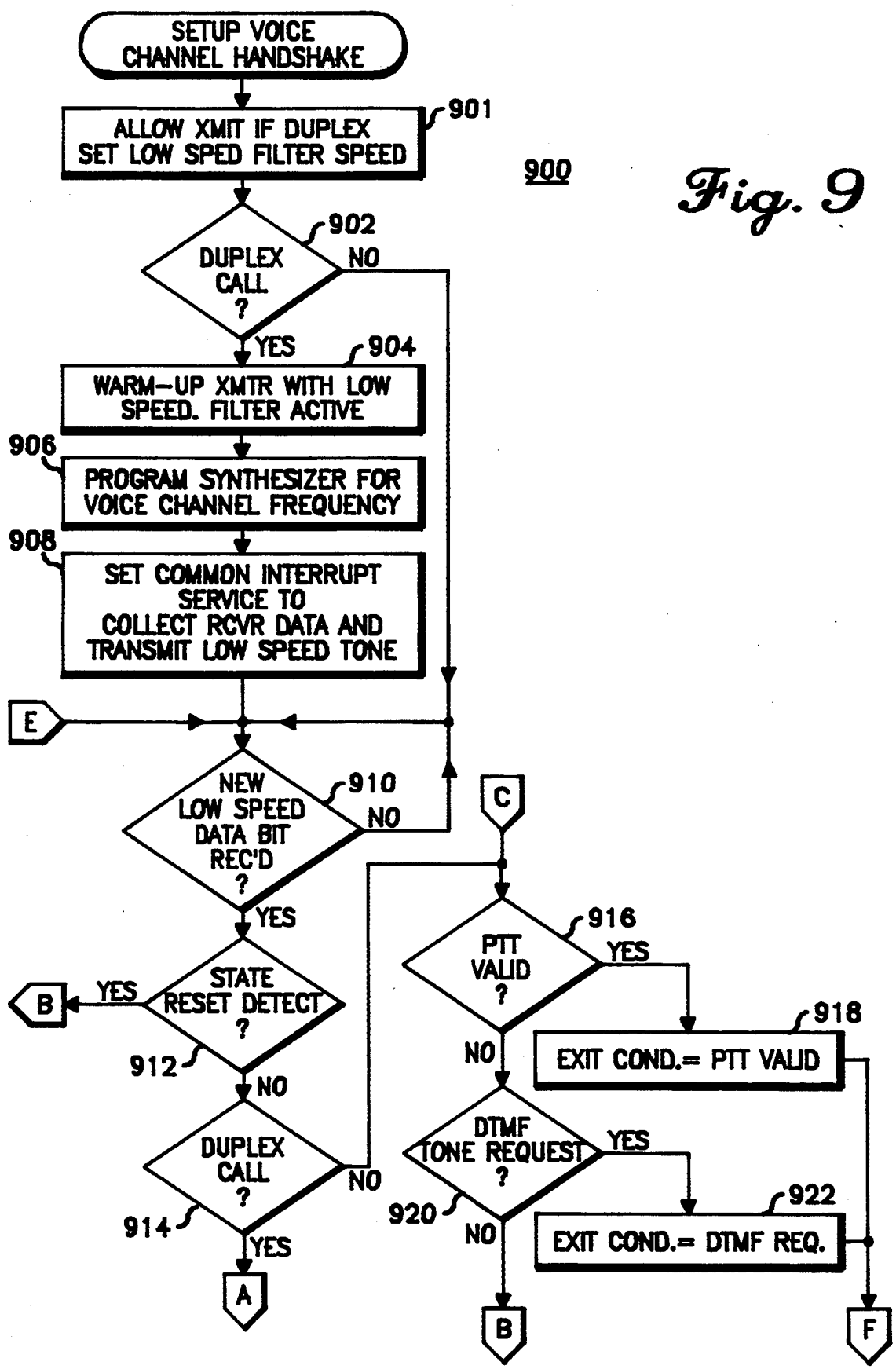

Referring now to FIG. 9, background routine 900 begins with decision 902 to determine whether the current call-type is duplex interconnect. Subscriber unit hardware and software status is typically initialized for simplex dispatch or via the call type executive routine. If the call is duplex, hardware is initialized to commence operation. Item 904 activates transmitter circuitry control signals to insure that analog circuitry is activated from the quiescent state. Filters 606 and 612 in FIG. 6 are activated in the low speed data or low frequency mode.

Item 908 sets an interrupt vector to execute subroutine 810 and then 820 in FIG. 8. Decision 910 is reached in this manner if the call is simplex.

Routine execution is set such that decision 910 is reached each time a complete low speed data bit has been received. A state reset condition is flagged if the current call has been terminated. In this case, the routine is exited and control transfers to the call executive routine. The subscriber unit 104 then resynchronizes to the central controller control channel data stream.

Decision 914 is selected if a state reset flag is not detected. If not, decision 914 selects routine 1200 in FIG. 12 if either a duplex interconnect call or DTMF tones are required. If the call type is simplex, decision 916 tests to determine whether a valid push-to-talk (PTT) state exists. If so, decision 1104 in FIG. 11 checks to see if the allowed transmission time has expired. If this is the case, control is returned to the call type executive routine to terminate the current transmission, and initiate a user timeout tone that is active as long as push-to-talk is asserted. This condition is stored via item 918.

Figure 11A:
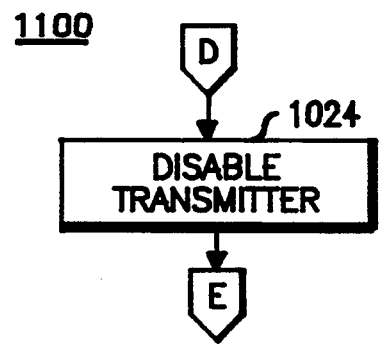
Figure 11B:
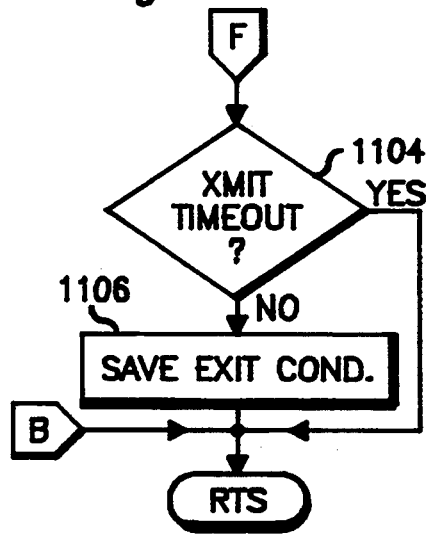

Alternatively, if a valid push-to-talk condition is not detected, but decision 920 determines that DTMF tones are needed, item 922 stores this condition, the routine exits via decision element 1104 and item 1108 in FIG. 11, control is returned to the call type executive routine, and finally to a DTMF tone service routine (not shown) that directs the microprocessor to generate the high group (H.G.) and low-group (L.G.) tones, that when summed via summer 610 in FIG. 6, become DTMF tone signals.

Figure 10:
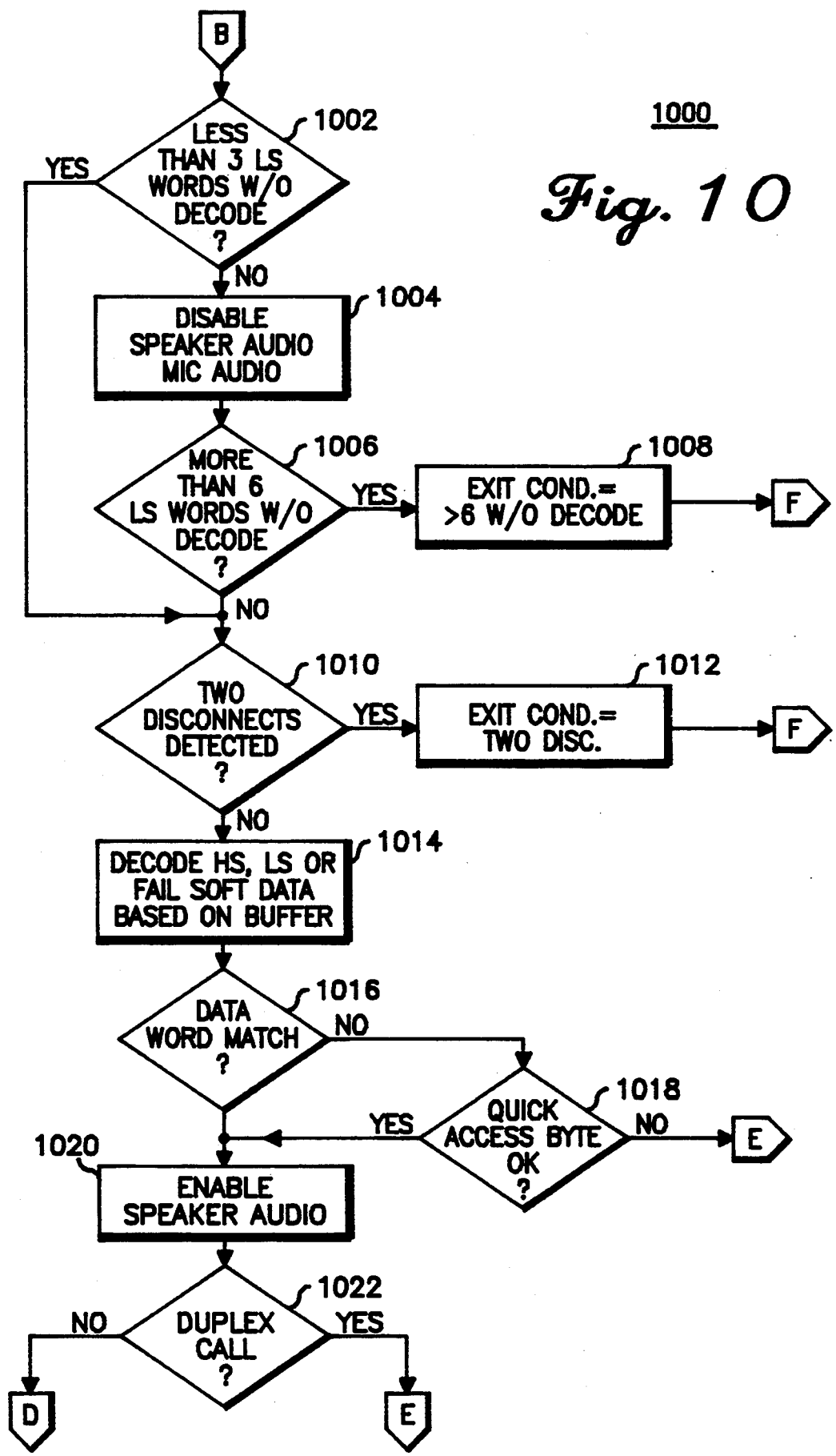

Routine 1000 in FIG. 10 is selected if the requested call is simplex, arid no DTMF tones are needed, and the subscriber unit is in receive mode. Decisions 1002 and 1006 measure the number of sequential, correctly-decoded low speed data words. If less than three words have been correctly decoded, a buffer is checked for two central controller-issued disconnects. If this is found to be true in decision 1010, control is transferred to subroutine 1100, item 1104 after which an appropriate exit status is flagged via item 1008.

Alternatively, if decision 1002 determines that more than three words are erroneously decoded, item 1004 disables all audio outputs of the subscriber unit. The present invention will still allow transmission from the subscriber unit unless decision 1006 determines that more than six incorrectly-decoded words have passed, else decision 1010 is again executed, as above.

Then, if two disconnects are not present, the previously-buffered data are decoded. Decision 1016 tests for a properly decoded entire data word. If one is not decoded, a smaller data sub-frame is checked in a final effort by decision 1018 to enable or continue duplex receive audio. If decision 1018 fails, data bit buffering continues in the present invention as control is transferred to routine 900, FIG. 9. If the test in either decision 1016 or 1018 passes, speaker audio is (re) unmuted, depending upon previous status.

Finally, routine 1000 concludes with decision 1022 testing for the presence of a duplex call status. If the call is not duplex, the present invention disables the transmitter in item 1024, FIG. 11. A detected duplex call causes control to be transferred to routine 900 to continue receiving and buffering additional low speed data.

Figure 12:
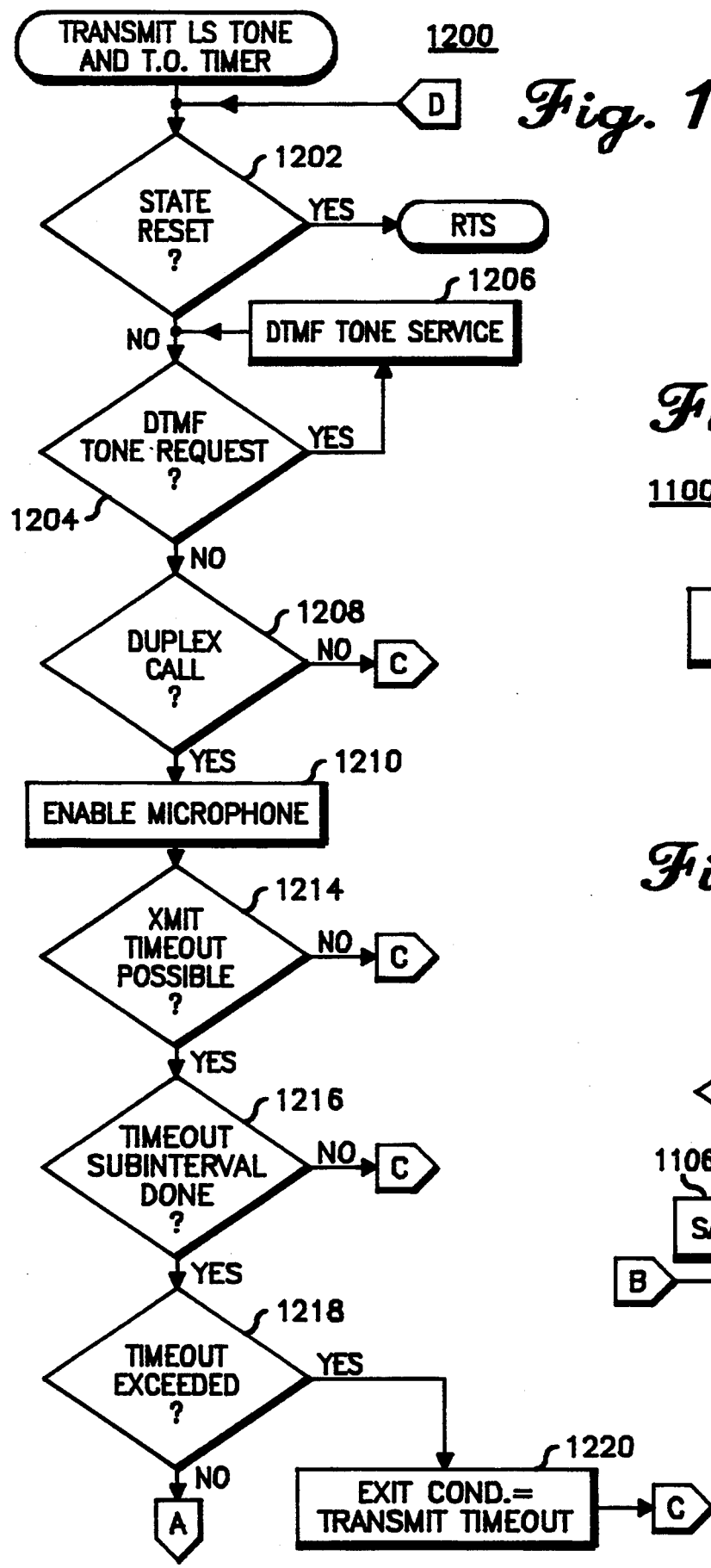

Returning briefly to decision 914 in FIG. 9, if a duplex call was detected, control is transferred to routine 1200 in FIG. 12. Since this routine can be entered from several other routines, decision 1202 again tests for a unit state reset. If one is found, control returns to the call executive routine to terminate the current call. Decision 1204 tests for, and item 1206 services a DTMF tone service request if one is pending. In this fashion, multiple DTMF tones corresponding to multiple subscriber key closures are processed.

Decision 1208 enables the subscriber unit microphone audio if the current call is duplex, else control transfers to decision 916 in routine 900. If the current call transmission time has a pre-set timeout, subinterval, decision 1216 tests to see if this has expired. If it has not, the present invention allows control to transfer to routines 900 and then to return to routine 1000, so as to allow the receiver continue to receive and buffer data from the central controller concurrent to the presently described transmitter operation.

If the timeout subinterval is done, decision 1218 tests the transmission time against the entire timeout period for completion. If not completed, the routine 1200 repeatedly executes, after the periodic interrupt service routine is completed. Else, if the timeout time expires, an exit code is set via item 1220, which returns control to routine 900. Routine 900 in turn transfers control to routine 1100, which finally returns control to the call type excutive routine and thus terminates the call (duplex) or transmitter transmission (simplex interconnect or dispatch).

In summary, a subscriber unit for achieving duplex voice interconnect over a conventional trunked radio system has been described. According to the principles of the present invention, an improved duplex capable subscriber unit is achieved by coupling a microprocessor to a duplex transceiver through switchable filters. The filters exhibit a relatively fast or slow time constant depending on the state of a filter control input. The microprocessor is then capable of operating the subscriber unit with optimum frequency response characteristics depending on whether voice or data is being received. In addition, a summing network coupled between the microprocessor and the transmit switchable filter allows the duplex subscriber unit of the present invention to generate DTMF signaling. Accordingly, other uses and modifications of the present invention will be obvious to one of ordinary skill in the art without departing from the spirit and scope of the present invention.

I claim:

1. A subscriber unit for use in a simplex/duplex communication system, comprising:
   (a) duplex transceiver means having data/tone and voice transmitter inputs and demodulated data, and voice outputs;
   (b) processor means for generating data and DTMF tones, decoding received data, controlling the overall operation of said subscriber unit and generating a signal indicating whether data or voice is currently being received;
   (c) summing means coupled to the DTMF tone and data outputs of said processing means for combining the DTMF tones generated by said processor means;
   (d) first filter means having an input responsive to said generated signal for switchably controlling the frequency response of said filter, coupled between said summing means and the data/tone transmitter input of said transceiver means;
   (e) second filter means having an input responsive to said generated signal for switchably controlling the frequency response of said filter, coupled between the receiver output of said transceiver means and said processing means.

2. A duplex interconnect capable subscriber unit for use with a dispatch trunked radio system, said subscriber unit comprising:
   (a) Antenna means for receiving and transmitting an R.F. signal;
   (b) Duplexer means for coupling signals to said antenna from modulator and demodulator circuits;
   (c) means for modulating voice and data signals coupled to said duplexer means;
   (d) means for receiving and demodulating voice and data signals coupled to said duplexer means;
   (e) processor means for decoding received data, generating data to be transmitted, generating DTMF tones and controlling the overall operation of the subscriber unit including controlling the frequency response of switchable filters depending on whether data or voice is currently being received;
   (f) summer means for combining data and tone information generated by said processor means;
   (g) first filter means having an input for switchably controlling the transmit frequency response of the subscriber unit, said filter coupled between the modulator means and the summer means; and
   (h) second filter means having an input for switchably controlling the receive frequency response of the subscriber unit, said filter disposed between said receiver means and said processing means.

3. The subscriber unit as recited in claim 1 wherein the frequency response of said second filter means is switched in response to a received signal having a variable data rate.

4. The subscriber unit as recited in claim 1 wherein the frequency response of said first filter means is switched in response to a generated signal which indicates the data rate of a signal to be transmitted.

5. The subscriber unit as recited in claim 1 wherein said first filter means is switchable between first and second frequency responses, wherein said first frequency response is characterized by a maximally flat Bessel function, and said second frequency response is characterized as a Chebychev function.

6. The subscriber unit as recited in claim 2 wherein the frequency response of said second filter means is switched in response to a received signal having a variable data rate.

7. The subscriber unit as recited in claim 2 wherein the frequency response of said first filter means is switched in response to a generated signal which indicates the data rate of a signal to be transmitted.

8. The subscriber unit as recited in claim 2 wherein said first filter means is switchable between first and second frequency responses, wherein said first frequency response is characterized by a maximally flat Bessel function, and said second frequency response is characterized as a Chebychev function.

9. A duplex interconnect capable subscriber unit for use with a dispatch trunked radio system, said subscriber unit comprising:
   (a) antenna means for receiving and transmitting an R.F. signal;
   (b) duplexer means for coupling signals to said antenna means from a modulator circuit and to a demodulator circuit from said antenna means;
   (c) modulating means for modulating voice and data signals coupled to said duplexer means;
   (d) receiver means for receiving and demodulating voice and data signals coupled to said duplexer means;
   (e) processor means for decoding at least some received data, generating at least some data to be transmitted, and for controlling at least some operating functions of said subscriber unit;
   (f) first filter means responsive to said processor means for switchably controlling data transmission frequency response of said subscriber unit, wherein said first filter means has a frequency response that may be varied by said processor means to accomodate both voice mode and data mode of operation, and wherein said first filter means is operably coupled between said modulating means and said processor means; and
   (g) second filter means responsive to said processor means for switchably controlling received data frequency response of said subscriber unit, wherein said second filter means has a frequency response that may be varied by said processor means to accomodate both voice mode and data mode of operation, and wherein said second filter means is operably coupled between said receiver means and said processor means.

10. The subscriber unit of claim 9 wherein said processor means further functions to generate DTMF tones.

11. The subscriber unit of claim 10 and further including summer means operably disposed between said processor means and said modulating means, for combining data and DTMF tone information and for providing such combined information to said modulating means.

12. The subscriber unit of claim 9 wherein said data as generated by said processor means can at least include a low speed data signal and a high speed data signal.

13. The subscriber unit of claim 12 wherein said processor means further functions to generate DTMF tones.

14. The subscriber unit of claim 13 and further including summer means operably disposed between said processor means and said modulator means, for combining said data signals and said DTMF tone information and for providing such combined information to said modulator means.

15. The subscriber unit of claim 9 wherein said second filter means has a frequency response that can be switched in response to variations in a received signal's data rate.

16. The subscriber unit of claim 9 wherein said first filter means has a frequency response that can be switched in response to a signal indicating a data rate for a signal to be transmitted.

17. The subscriber unit of claim 16 wherein said frequency response for said first filter means can be switched between a first and second frequency response.

* * * * *